United States Patent
Toba (10) Patent No.: US 6,726,082 B2
(45) Date of Patent: Apr. 27, 2004

(54) SOLDERING APPARATUS

(75) Inventor: Hideaki Toba, Yokohama (JP)

(73) Assignee: Nihon Den-Netsu Keiki Co., Ltd. (JP)

( * ) Notice: Subject to any disclaimer, the term of this patent is extended or adjusted under 35 U.S.C. 154(b) by 0 days.

(21) Appl. No.: 10/269,985

(22) Filed: Oct. 15, 2002

(65) Prior Publication Data

US 2003/0080175 A1 May 1, 2003

(30) Foreign Application Priority Data

Nov. 1, 2001 (JP) ........................................ 2001-336279
Nov. 1, 2001 (JP) ........................................ 2001-336280

(51) Int. Cl.$^7$ ................................................ B23K 1/08
(52) U.S. Cl. .......................................................... 228/37
(58) Field of Search ..................................... 228/37, 260

(56) References Cited

U.S. PATENT DOCUMENTS

| | | | | |
|---|---|---|---|---|
| 3,797,724 A | * | 3/1974 | Flury et al. ................. | 228/37 |
| 3,941,088 A | * | 3/1976 | Ronafoldi et al. ........... | 118/620 |
| 4,568,012 A | * | 2/1986 | Kakuhata et al. ............. | 228/37 |
| 4,828,459 A | | 5/1989 | Behrens ....................... | 417/50 |
| 5,816,474 A | | 10/1998 | Flury ........................... | 228/37 |
| 5,981,922 A | * | 11/1999 | Masuda et al. .............. | 219/615 |
| 6,050,473 A | * | 4/2000 | Masuda et al. .............. | 228/37 |
| 6,364,195 B1 | * | 4/2002 | Masuda et al. .............. | 228/37 |

FOREIGN PATENT DOCUMENTS

| | | | | |
|---|---|---|---|---|
| EP | 271611 | | 12/1986 | ............ H01B/3/04 |
| EP | 0 271 611 A1 | * | 12/1986 | ............ H01B/3/04 |
| EP | 849023 | | 6/1997 | ............ B23K/1/08 |
| EP | 858856 | | 6/1997 | ............ B23K/1/08 |
| GB | 1399707 | | 10/1972 | ............ C23C/1/14 |

* cited by examiner

Primary Examiner—M. Alexandra Elve
Assistant Examiner—Kevin P. Kerns
(74) Attorney, Agent, or Firm—Lorusso, Loud & Kelly; George Loud (57) ABSTRACT

A soldering apparatus for soldering a printed wiring board includes a solder vessel for containing molten solder, a nozzle disposed in the vessel and having opposing first and second opening, and an electromagnetic pump secured in the vessel and including a tubular member defining a solder flow path therein and having an inlet and an outlet connected to the second opening of the nozzle. The pump has cores and coils disposed at a position below the surface level of the molten solder and arranged to generate a moving magnetic field in the path when the coils are electrically energized, so that the molten solder is fed from the inlet to the outlet and is projected from the first opening of the nozzle to form a solder wave.

24 Claims, 11 Drawing Sheets

SOLDERING APPARATUS

CROSS-REFERENCE TO RELATED APPLICATIONS

This application claims, under 35 USC 119, priority of Japanese Patent Applications No. 2001-336279 filed Nov. 1, 2001 and No. 2001-336280 filed Nov. 1, 2001.

BACKGROUND OF THE INVENTION

This invention relates to an apparatus for soldering a printed wiring board having electronic components mounted thereon.

A wave soldering apparatus needs a pump for forming a projected wave of solder. The pump supplies molten solder to a nozzle which may have various configurations and ejects it from an upper opening to generate a projected wave of solder. Naturally, at this time, the solder is heated and is in a molten state.

Various types of pumps are used in wave soldering apparatuses, such as mechanical pumps including centrifugal pumps, helical pumps, rotary blade pumps and piston pumps, and electromagnetic pumps including induction type electromagnetic pumps and conduction type electromagnetic pumps.

Each type of pump has merits and demerits. For example, mechanical pumps are highly efficient and can convert input energy to the driving motor thereof into delivery energy with little conversion loss. However, the flow of molten solder delivered from a mechanical pump is unstable and apt to fluctuate.

On the other hand, electromagnetic pumps have the merit of being able to form a stable and smooth flow of molten solder, but, in general, are inefficient and cannot convert input energy into delivery energy without a large conversion loss. Also, electromagnetic pumps have a moving magnetic field generating mechanism, namely, a magnetic circuit comprising a moving magnetic field generating coil and a core, which generates a large amount of leakage magnetic field that may cause exposure of operators to a magnetic field greater than they would receive in nature or which generates inductive current in electronic components, especially components having coils, mounted on the printed circuit board thereby damaging, imparting stress to, or at worst breaking, semiconductor components with low withstand voltages. Resistors (R), capacitors (C) and coils (L) are basic passive components comprising an electronic circuit and are used in almost all electronic circuits. Thus, coils are not special electronic components.

Linear electromagnetic pumps (LEP) directly apply an electromagnetic force to a medium to be transported to generate a thrust therein and use the thrust as a delivery force and a suction force. LEP pumps are roughly divided into two types: induction type and conduction type. In general, induction type pumps, which do not require passage of electric current through the medium to be transported, are widely used.

Induction type electromagnetic pumps include FLIP 20 type (flat linear induction pump), ALIP type (annular linear induction pump), and HIP type (helical induction pump). Each type of pump has its own peculiar constitution.

A wave soldering apparatus employing an FLIP type electromagnetic pump has been proposed in, for example, JP-A-S49-65934, JP-A-S58-122170, W097/47422 and JP-H11-104817. In the apparatuses described in JP-A-S58-122170 and JP-H11-104817, means for preventing the magnetic field generating coil from being overheated is provided. Namely, the magnetic field generating coil is installed in a position where it is easily cooled and cool air is supplied thereto with a cooling fan or the like so that the temperature of the moving magnetic field generating coil does not exceed a temperature which it can withstand. The temperature which the coil can withstand is generally determined as a temperature up to which the integrity of the insulation of the coil can be maintained.

The temperature rise in the magnetic field generating coil is attributed to copper loss caused by the current flowing in the coil itself and to iron loss caused by eddy currents generated in the iron core on which the coil is wound. In addition, the temperature rise of the magnetic field generating coil is also caused by heat transferred from the solder vessel containing the solder.

In general, a wave soldering apparatus for soldering electronic components must form a projected wave of solder having a width of at least 20 mm, a length of at least 350 mm and a height of 4–10 mm to secure sufficient time of contact between the projected wave and a printed circuit board so that the printed circuit board can be well wetted with solder. Thus, an induction type electromagnetic pump (which will be hereinafter referred to simply as "electromagnetic pump") for generating such a projected wave generally requires an input power of several kW at most.

As described in W097/47422, the flow path of the electromagnetic pump in which a moving magnetic field is applied to the solder to provide a thrust, more specifically, a delivery force and a suction force, thereto is narrow and long (for example, a few mm in width and several dozen cm in length) and has to be cleaned as necessary. Namely, it is necessary to remove the nozzle which generates the projected wave and to scrape off grime such as dross adhered thereto by inserting a long and thin rod or the like. It is also taught that the flow path may be cleaned by backwash.

Dross, which is an oxide of solder and so on, has strong adhesiveness and thus does not usually fall off by itself once adhered. Thus, when dross starts adhering in the flow path of an electromagnetic pump, it gradually accumulates and becomes large. The deposits may block the flow of solder in the flow path to cause a non-uniform flow, so that the projected wave formed above the nozzle varies in height and fluctuates in amount, resulting in lowering of the soldering quality of the work pieces such as the printed circuit boards.

Electromagnetic pumps have no movable parts such as rotating or reciprocating parts, no parts which are subjected to abrasion and no moving mechanisms such as a motor used as rotational driving means or a fluid pressure actuator used as reciprocating driving means. However, in electromagnetic pumps, pump delivery, namely, the amount of work relative to input electric power is low and energy efficiency is less than half of that of rotary pumps driven by rotary motors. Thus, a wave soldering apparatus employing an electromagnetic pump consumes a larger amount of energy as compared with a conventional wave soldering apparatus. Since most of the energy loss produced in the electromagnetic pump is radiated as heat, it is necessary to use forced cooling means such as a cooling fan in order to discharge the heat into the atmosphere.

In addition, in order to form a projected wave of the desired magnitude, it is necessary to input power of several kW at most to the electromagnetic pump to apply a very strong moving magnetic field to the solder. This causes a large leakage magnetic field from the moving magnetic field generating coil and the periphery of the core.

The leakage magnetic field is an alternating magnetic field having an amplitude which is much larger than that seen in nature. Thus, the operators must be careful in working around an electromagnetic pump. Also, when the leakage magnetic field acts on electronic components to be mounted on a printed circuit board, an inductive current which can damage or stress, or at worst break, semiconductor components for micropower, especially semiconductor components for low voltage, is generated in electronic components having coils. Particularly, when an electromagnetic pump is disposed below an opening for projecting a solder wave as in JP-AS49-65934, W097/47422 and so on, the leakage magnetic field which acts on the electronic components is the maximum.

Also, as described before, an electromagnetic pump has a narrow and long flow path which allows adhesion and deposition of grime such as dross in a short time and thus requires frequent cleaning. Additionally, in each cleaning, the nozzle must be removed and a long and thin rod must be inserted into the narrow and long path to scrape off all the grime having adhered therein. This is very difficult and inefficient work, since, as described before, dross has strong adhesion and the effect of backwashing in actual practice can hardly reach the dross having adhered and deposited in the flow path.

Moreover, there is the concern that a stray current generated by the leakage magnetic field may flow into the projected wave and then into a printed circuit board being soldered.

SUMMARY OF THE INVENTION

It is, therefore, an object of the present invention to provide a wave soldering apparatus which utilizes an electromagnetic induction pump but which has a high energy efficency, comparable to that of a conventional device using a pump driven by a rotary motor.

Another object of the present invention is to provide a soldering apparatus of the above-mentioned type, which can reduce leakage magnetic field to the minimum.

It is a further object of the present invention to provide a soldering apparatus of the above-mentioned type, in which cleaning and other maintenance of the pump and other parts can be carried out easily and securely so that the soldering cost may be reduced and the soldering quality and reliability may be improved.

It is a further object of the present invention to provide a soldering apparatus of the above-mentioned type, which can prevent stray current from flowing in the projected wave.

In accordance with the present invention there is provided a soldering apparatus for soldering a printed wiring board, comprising:
  a solder vessel for containing a molten solder;
  a nozzle disposed in said vessel and having a first opening at one end thereof and a second opening at the other end thereof, said first opening being disposed above the surface level of the molten solder contained in said vessel; and
  an electromagnetic pump secured in said vessel and including
    a tubular member defining a solder flow path therein and having an inlet and an outlet connected to said second opening of said nozzle such that the molten solder can flow from said inlet to said outlet through said path,
    one or more cores, and
    one or more electrically energizable coils, said tubular member, said cores and said coils being disposed below the surface level of the molten solder and arranged to generate a moving magnetic field in said path when said coils are electrically energized, so that the molten solder is fed from said inlet to said outlet and is projected from said first opening of said nozzle to form a solder wave.

In the soldering apparatus as described above, since the whole of the electromagnetic pump is immersed in the solder contained in the solder vessel, all the loss, namely thermal energy, from the electromagnetic pump is transferred to the solder and is used as energy to heat the solder without any leakage outside of the solder vessel.

Since the loss generated in the electromagnetic pump is used as energy to heat the solder, the amount of energy supplied to the solder heating means can be reduced by that amount. Namely, all the energy supplied to the electromagnetic pump and the heating means is supplied to the solder in the solder vessel and almost no energy is discharged as waste. This considerably improves the overall energy efficiency of the soldering apparatus.

The solder around the electromagnetic pump serves as a short ring (which is also referred to as "short band" and well-known in the field of power transformers) against leakage magnetic field and attenuates it, so that magnetic field leaked from the electromagnetic pump cannot leak from the solder vessel or from the surface of the solder. No magnetic field can leak out of the soldering apparatus, so that the operators, the printed circuit board and electronic parts mounted thereon are not adversely affected by leakage magnetic field.

BRIEF DESCRIPTION OF THE DRAWINGS

Other objects, features and advantages of the present invention will become apparent from the detailed description of the preferred embodiments of the invention which follows, when considered in the light of the accompanying drawings in which:

FIG. 7(*a*) is a perspective view schematically illustrating an interior core rod of the annular linear induction pump of FIG. 6;

FIG. 7(*b*) is a perspective view schematically illustrating the pump of FIG. 6 which has been detached from the nozzle and from which the core rod has been removed;

FIG. 7(*c*) is a perspective view schematically illustrating an upper side of the nozzle of FIG. 6 from which the pump has been removed;

DETAILED DESCRIPTION OF THE PREFERRED EMBODIMENTS OF THE INVENTION

Figure 1:
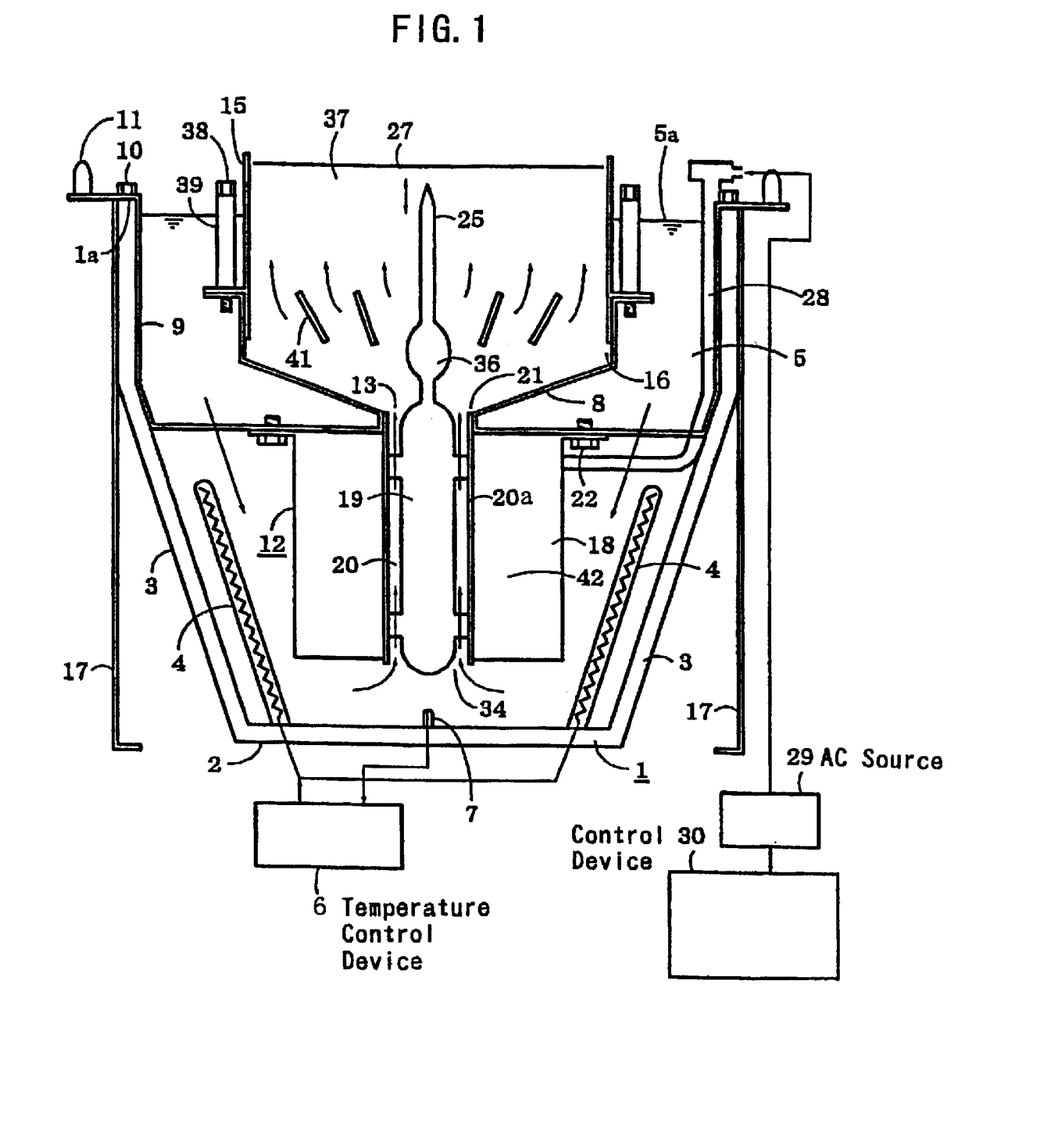
FIG. 1 is an elevational, cross-sectional view schematically illustrating an embodiment of a soldering apparatus according to this invention.
Figure 2:
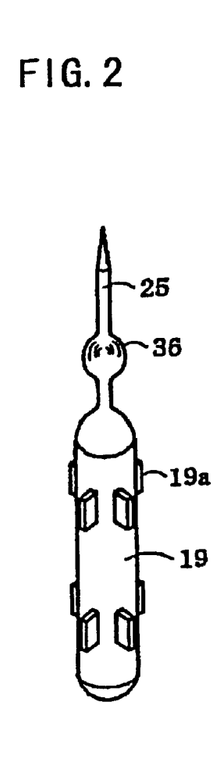
FIG. 2 is a perspective view schematically illustrating an interior core rod of the annular linear induction pump of FIG. 1.

Hereinafter a first embodiment of a soldering apparatus according to the present invention will be described with reference to FIGS. 1–3. In FIG. 1, a control system for an electromagnetic pump and a solder temperature control system are shown as block diagram.

A solder vessel 1 supported by a casing 17 has vessel walls 3 including a bottom wall 2. A heater 4 is provided for heating molten solder 5 in the solder vessel 1 and for maintaining the molten solder 5 at a desired temperature. A temperature sensor 7 electrically coupled with a temperature control device 6 is also disposed in vessel 1. Thus, the temperature of the molten solder 5 is controlled within a predetermined range by the temperature control device 6, which receives a signal from the temperature sensor 7 and controls the electric power to be supplied to the heater 4.

Disposed in the vessel 1 is a nozzle 8 having one end provided with an injection member 15 having a first opening 37 and the other end defining a second opening 21. As long as the first opening 37 is disposed above the surface level 5a of the molten solder 5 contained in the vessel 1 and the second opening 21 is located below the surface level 5a, the shape and orientation of the nozzle are not specifically limited. Thus, while the nozzle is disposed vertically in the specific embodiment shown in FIG. 1, the nozzle 8 may be disposed in a slanted position, if desired.

The nozzle 8 has a hanging support 9 suspended from the upper edges 1a of the solder vessel 1 and secured thereto by screws 10. Handles 11 are provided on the hanging support 9 and used to lift the nozzle 8 out of the solder vessel 1.

In the specific embodiment shown, the injection member 15 is formed separately from the nozzle 8 and is detachably fitted into the nozzle 8 at a middle portion 16 thereof. The injection member 15 is secured by screws 38 inserted through sleeves 39. The fixing screws 38 are located above the surface level 5a of the solder 5 to facilitate replacement. Although not illustrated, flow smoothing means comprising a porous plate or the like may be provided within the injection member 15. In general, the injection member 15 is changed in accordance with the type of the printed circuit board (not shown), namely the conditions of mounting of the electronic components so that a projected wave of optimum configuration to obtain the best soldering quality can be formed. The nozzle 8 is provided therein with flow guide plates 41 for smoothing the flow of the solder 5.

Provided below the nozzle 8 is an ALIP type electromagnetic pump 12 having a housing secured by screws 22 to the hanging support 9. The pump 12 has a non-magnetic tubular member 20a defining a path 20 therein and having an inlet or suction port 34 and an outlet or a discharge port 13 connected to the second opening 21 of the nozzle 8 so that the molten solder 5 can flow from the inlet 34 to the outlet 13 through the path 20.

The ALIP type electromagnetic pump 12 has a core rod 19 disposed in the tubular member 20a so that the path 20 defined therebetween has an annular shape. Core members 18, around which coils 42 are wound, surround the tubular member 20a. The tubular member 20a, cores 19 and 18 and coils 42 are disposed at a position below the surface level 5a of the molten solder 5 and arranged to generate a moving magnetic field in the annular path 20 when the coils 42 are electrically energized, so that the molten solder 5 is fed from the inlet 34 to the outlet 13 and is projected from the first opening 37 of the nozzle 8 to form a solder wave 27. The ALIP type electromagnetic pump 12 illustrated in FIG. 1 is called a straight through type as the flow path 20 therein is straight.

Disposed in the vessel 1 is a wiring pipe 28 10 through which a line is run for electrically connecting the coils 42 of the electromagnetic pump 12 with a multi-phase AC power source (such as a VVVF three-phase inverter power source) 29 and for supplying multi-phase AC electric power to the coil 42. The multi-phase AC power source 29 has output voltage and frequency which can be arbitrarily adjusted through communication with a control device 30. The control device 30 comprises a computer system and includes a command input device such as a keyboard and a display part such as a LCD. The operation of the multi-phase AC power source 29 is controlled by commands from the command input device.

Detailed description of the coils 42 and outside core members 18 of the ALIP type electromagnetic pump 12 is omitted here, because such components are well known in the art and described in, for example, Japanese examined patent publication JP-B-H05-57821, the disclosure of which is hereby incorporated by reference herein.

The central core rod 19 is removably supported in the tubular member 20a. FIG. 2 shows the core rod removed from the tubular member 20a. The core rod 19 has an outer peripheral surface provided with projections 19a engageable with L-shaped stoppers formed in the inside surface of the tubular member 20a so that, by inserting and rotating the core rod 19, the core rod 19 can be detachably secured.

The core rod 19 has an upper end from which a handle 25 extends upward into the nozzle 8 such that the tip end of the handle 25 is positioned above the surface of the solder 5 when the pump 12 is stopped. An enlarged portion or protuberance 36 is provided at a mid-portion of the handle 25 so that the flow of the solder 5 delivered from the outlet 13 of the electromagnetic pump 12 can be uniformly diffused.

Figure 3:
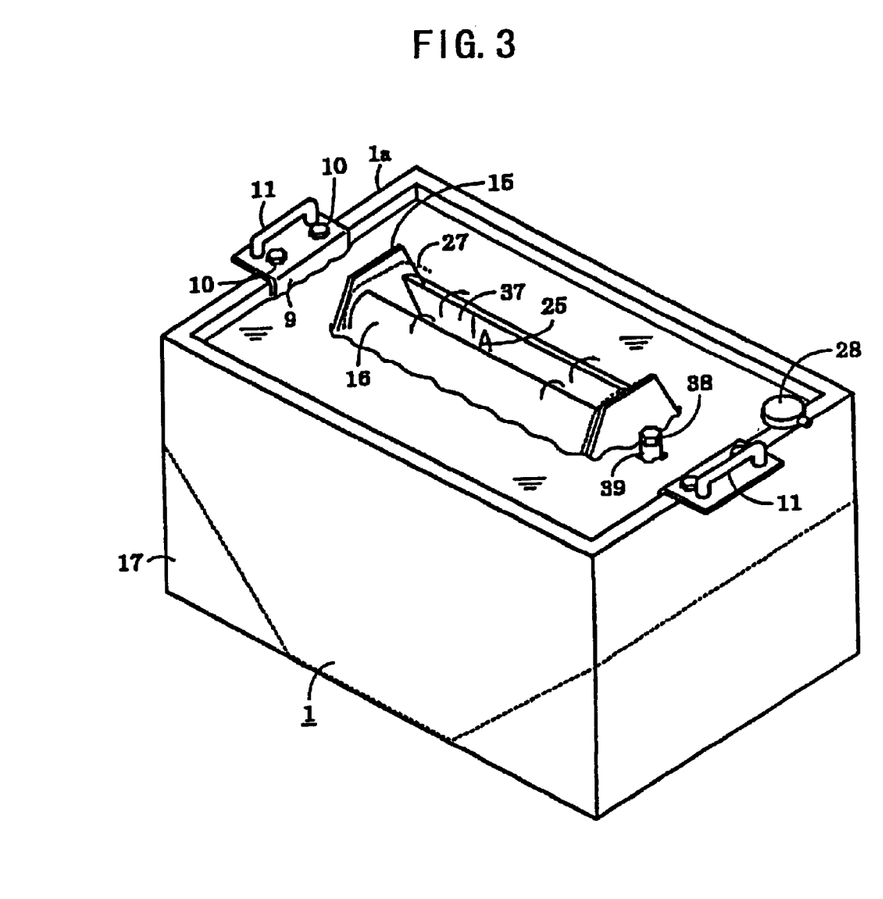
FIG. 3 is a perspective view of the soldering apparatus of FIG. 1.

As shown in FIG. 3, the projected wave 27 of the molten solder forms on guide plates 16 provided on both sides of the first opening 37 of the injection member 15. In FIG. 3, the projected wave 27 is shown in broken lines.

The melting point of the solder 5 depends on the type thereof. For example, the melting point is about 183° C. for a conventional tin-lead solder (for example, 37 wt % lead, balance tin), about 199° C. for a lead-free tin-zinc solder (for example, 9 wt % zinc, balance tin), and about 220° C. for a tin-silver-copper solder (for example, about 3.5 wt % silver, about 0.7 wt % of copper and balance tin).

Thus, the temperature of the solder 5 for use in soldering of printed circuit boards is selected depending upon the type of the solder 5. However, considering the temperatures which electronic parts to be mounted on the printed circuit boards can withstand, the solder 5 is used in a temperature range of about 220–260° C.

Thus, the electromagnetic pump 12, which is used immersed in the molten solder, must be able to withstand a temperature which is at least higher than the melting point of the solder 5. More specifically, the electromagnetic pump 12 is desired to be able to bear a temperature of about 220–260° C.

The temperature which the electromagnetic pump 12 can withstand is determined by the temperature which the insulator of the magnetic field generating coil used therein can withstand. A mica-alumina combined insulation can provide a service life of 3×10 hours at 650° C. ("Investigation on Voltage Life of Mica-Alumina Combined Insulation at High Temperature," MITSUI Hisayasu, KUMAZAWA Ryoji, AIZAWA Rie, OKAMOTO Tatsuki, ITO Tetsuo, and KANAGAMI Masaki, A Publication of Fundamentals and Materials Society, Vol. 117-A, No. 8, 1997) and is suitably used for the purpose of the present invention.

The above-described soldering apparatus operates as follows.

When electric power is supplied from the multi-phase AC power source 29, a moving magnetic field is generated in the solder flow path 20 of the electromagnetic pump 12, so that the solder 5 is given a thrust in the same direction as the moving direction of the magnetic field and is moved from the inlet 34 to the outlet 13. Thereby, the solder 5 in the solder vessel 1 is supplied to the nozzle 8, smoothed by the protuberance 36 provided on the handle 25 and the flow guide plates 41, projected from the first opening 37 to form the projected wave 27, and returned to the solder vessel 1, as shown by the arrows in FIGS. 1 and 3.

Although not shown, a printed circuit board having electronic components to be soldered is brought into contact with the projected wave 27 while it is transported on a transport conveyor. Thereby, the solder 5 is supplied to portions to be soldered on the printed circuit board.

When grime such as oxidized solder and dross are found to adhere to the inside of the flow path 20 of the electromagnetic pump 12, the pump 12 is stopped so that a tip portion of the handle 25 is exposed above the surface of the molten solder. The core rod 19 is then removed by grasping the tip portion with a pinching tool such as pincers. The solder flow path 20 is washed by inserting a cylindrical brush such as a cup brush made of a material which is not readily wet by solder 5, such as aluminum or carbon. The grime on the internal core 19 can be easily removed with a brush or a cloth. Thus, the cleaning is very easy and takes only a short time.

Additionally, the annular flow path 20 has a lower tendency to allow dross to adhere therein, so that the ALIP type electromagnetic pump does not have to be cleaned so frequently as a FLIP type electromagnetic pump.

Figure 4:
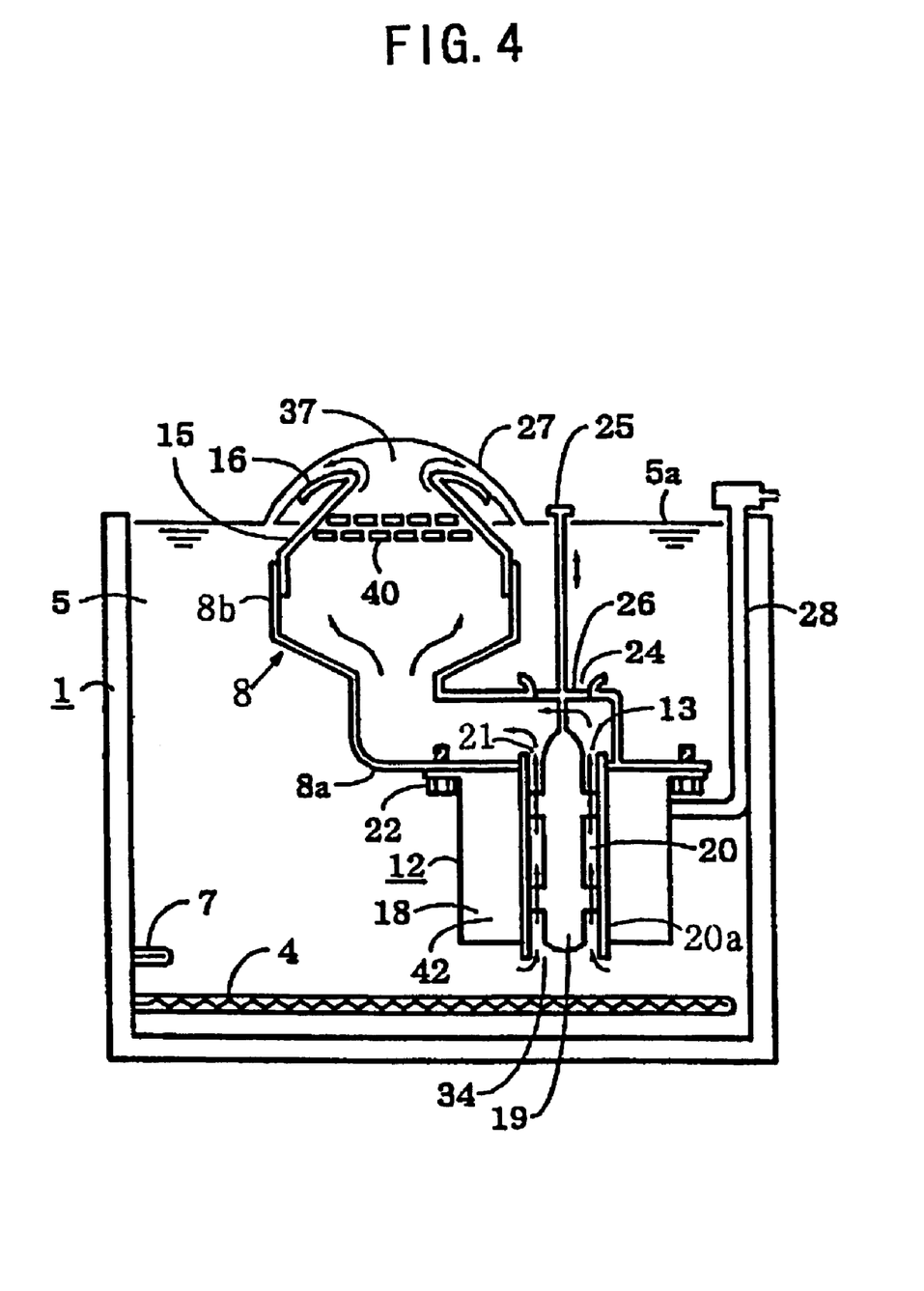
FIG. 4 is an elevational, cross-sectional view schematically illustrating a second embodiment of the soldering apparatus according to this invention.

FIG. 4 shows a second embodiment of the present invention. In FIG. 4, components designated by the same reference numerals as those in FIGS. 1 through 3 have similar function and the explanation of these components is not repeated here. A temperature control device electrically connected to a temperature sensor 7 and a heater 4, a multi-phase AC power source 29 for energizing coils 42, and a control device 30 are not shown. The essential difference between the second embodiment and the first embodiment is that while the electromagnetic pump 12 is vertically aligned with the injection member 15 in the first embodiment, the position thereof is slightly offset, as shown in FIG. 4, in the second embodiment. A nozzle generally designated as 8 in the second embodiment has an L-shaped cross-section as shown in FIG. 4.

More specifically, the nozzle 8 has a generally horizontally extending portion 8a and an upwardly extending portion 8b contiguous with the horizontally extending portion 8a. A second opening 21 of the nozzle 8 is formed in the bottom wall of an end portion of the horizontally extending portion 8a, so that molten solder 5 flows upward through an annular path 20, then horizontally through the horizontally extending portion 8a and thereafter upward through the upwardly extending portion 8b.

The horizontal portion 8a has a hole 24 provided in an upper side thereof at a position just above the core rod 19. A handle 25 extends upward from an upper end of the core rod and passes through the hole out of the nozzle 8 and terminates at a position above the surface 5a of the molten solder 5. A closure member 26 is secured to the handle 25 and is engageable with the hole 24, with a close fit so that the core rod 19, detachably secured to a tubular member 20a, can be removed from the tubular member 20a through the hole 24 by rotating and pulling the handle 25 upward. When the core rod 19 is mounted in position as shown in FIG. 4, the hole 24 is closed by the closure member 26.

In FIG. 4, designated as 40 is a flow control perforated plate disposed horizontally in the upwardly extending portion 8b of said nozzle 8 for uniformizing the flow of the molten solder through the nozzle 8. Such a horizontal plate 40 cannot be provided in the first embodiment in which the core rod 19 is removed through the opening 37.

In the first and second embodiments, the ALIP type electromagnetic pump 12 is employed in view of ease of cleaning. However, an FLIP type electromagnetic pump or an HIP type electromagnetic pump may be used, if desired. In the case of an FILP type electromagnetic pump, the thrust generating flow path is an elongated slit-like flow path, so that cleaning of the flow path is relatively difficult. Also, grime such as dross is more apt to adhere as compared with an ALIP type electromagnetic pump.

Figure 5:
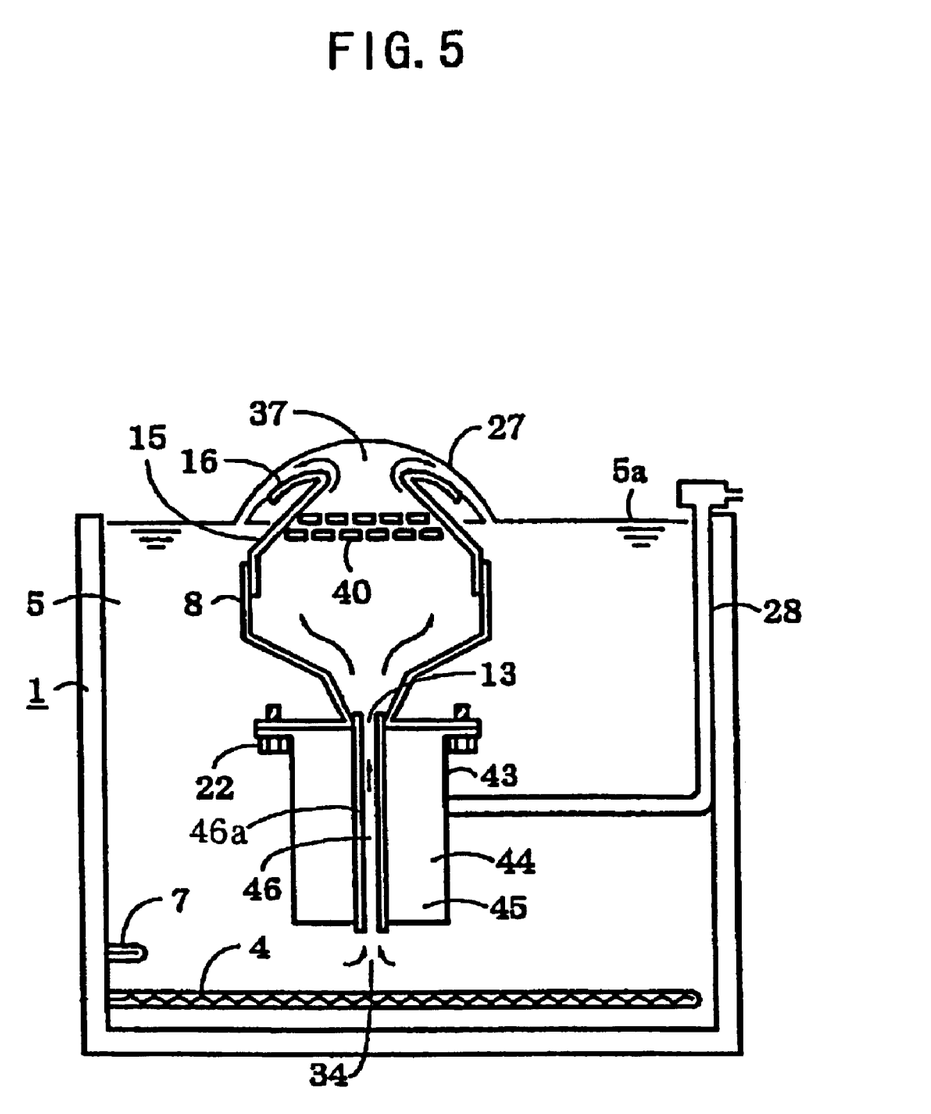
FIG. 5 is an elevational, cross-sectional view schematically illustrating a third embodiment of the soldering apparatus according to this invention.

FIG. 5 shows a third embodiment in which an FLIP type electromagnetic pump 43 is employed. In FIG. 5, components designated by the same reference numerals as those in FIGS. 1 through 3 have similar function and the explanation of these components is not repeated here. A temperature control device electrically connected to a temperature sensor 7 and a heater 4, a multi-phase AC power source 29 for energizing coils 42, and a control device 30 are not shown.

The FLIP type electromagnetic pump 43 has a flat slit-like flow path 46 defined by a flat tubular member 46a and no core rod. Housed cores 44 and coils 45 wound around the cores 44 are disposed on both sides of the flat tubular member. There is also a conventional FLIP type electromagnetic pump in which a housed core is disposed on one side of a flat tubular member with a housed core having coils wound therearound being provided on the other side thereof.

Figure 6:
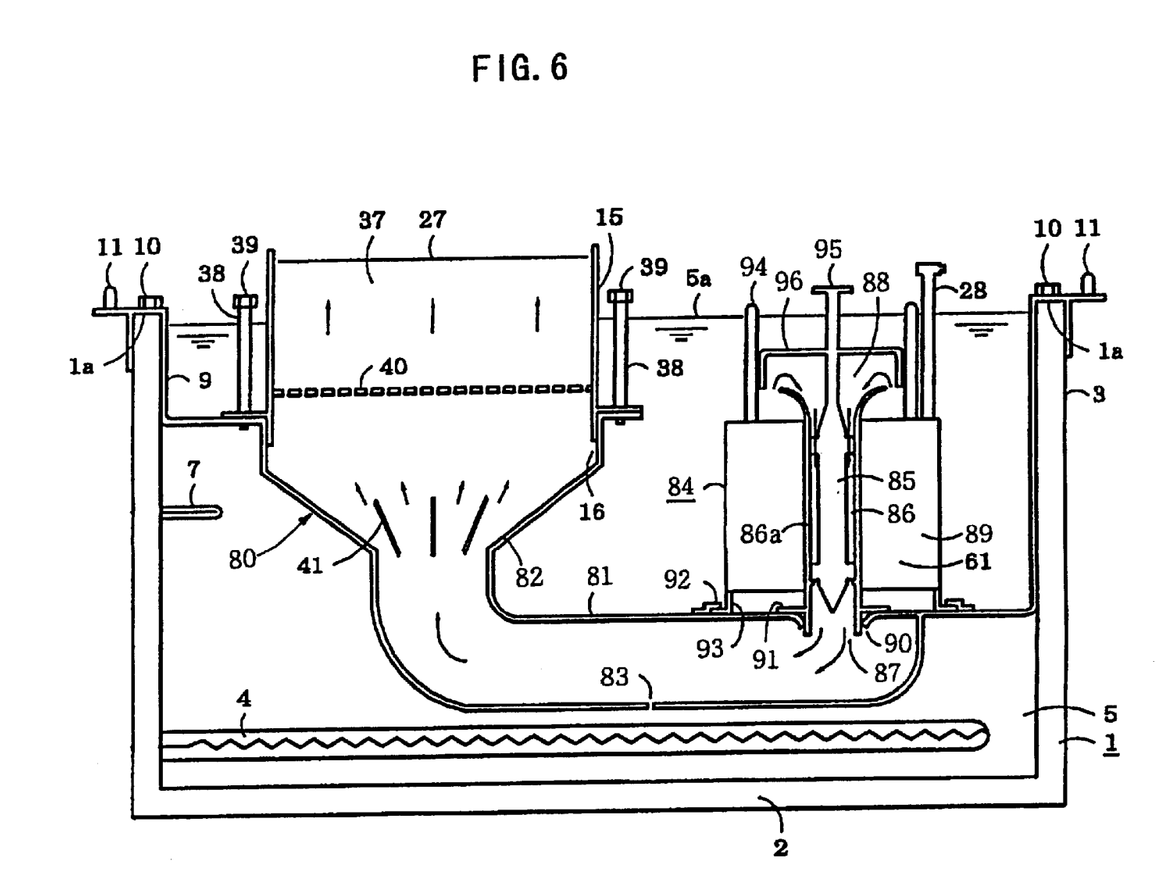
FIG. 6 is an elevational, cross-sectional view schematically illustrating a fourth embodiment of the soldering apparatus according to this invention.

FIG. 6 shows a fourth embodiment of the present invention. In FIG. 6, components designated by the same reference numerals as those in FIG. 1 have similar function and the explanation of most of these components is omitted here. A temperature control device electrically connected to a temperature sensor 7 and a heater 4, a multi-phase AC power source 29 for energizing coils 42, and a control device 30 are not shown. The essential difference between the fourth embodiment and the first embodiment resides in that, while the electromagnetic pump 12 is disposed in vertical alignment with the injection member 15 in the first embodiment, in the fourth embodiment the nozzle generally designated as 80 has an L-shaped cross-section as shown in FIG. 6 and in that the electromagnetic pump 84 is arranged to feed the molten solder downward.

The nozzle 80 which is disposed in a solder vessel 1 and supported by a hanging support 9 has one end provided with an injection member 15 having a first opening 37 and the other end defining a second opening 90. The nozzle 80 has a generally horizontally extending portion 81 and an upwardly extending portion 82 contiguous with the horizontally extending portion 81. While the upwardly extending portion 82 of nozzle 80 is disposed vertically in the specific embodiment shown in FIG. 6, the portion 82 may be disposed in a slanted position, if desired. Flow guide plates 41 and flow control perforated plate 40 are disposed in the upwardly extending portion 82 of the nozzle 80 for smoothing the flow of the solder 5 and for making the flow velocity and direction thereof constant so that a stable, uniform projected wave 27 may be formed above the first opening 37 of the injection member 15. Provided below the surface level 5a of the molten solder 5 contained in the vessel 1 is an ALIP type electromagnetic pump 84 having a housing secured to the hanging support 9. The pump 84 has a non-magnetic tubular member 86a defining a path 86 therein and having an inlet or suction port 88 and an outlet or discharge port 87 connected to the second opening 90 of the nozzle 80 such that the molten solder 5 can flow downward from the inlet 88 to the outlet 87 through the path 20. Since, in the fourth embodiment, the position of the injection member 15 is remote from the electromagnetic pump 84, no stray current can flow to the printed circuit board.

The ALIP type electromagnetic pump 84 has a core rod 85 disposed in the tubular member 86a so that the path 86 defined therebetween has an annular shape. Housed outside core members 89, around which coils 61 are wound, are disposed surrounding the tubular member 86a. The tubular member 86a, cores 85 and 89 and coils 61 are disposed below the surface level 5a of the molten solder 5 and arranged to generate a moving magnetic field in the annular path 86 when the coils 61 are electrically energized, so that the molten solder 5 is fed from the inlet 88 to the outlet 87 and flows horizontally through the horizontally extending portion 81 and thereafter upward through the upwardly extending portion 82 and is finally projected from the first opening 37 of the nozzle 80 to form a solder wave 27.

The electromagnetic pump 84 is detachably secured to the nozzle 80. The pump 84 has a flange 91 in the vicinity of the outlet 87 which engages with an upper surface of the horizontally extending portion 81 of the nozzle 80 when the outlet 87 of the electromagnetic pump 84 is fitted in the second opening 90 of the nozzle 80. As shown in FIG. 7(b) and FIG. 7(c), the pump 84 is provided with brackets 93 engageable with members 92 provided on the nozzle 80. Thus, the electromagnetic pump 84 is fixed on the nozzle 80 by press-fitting protrusions 93a of the brackets 93 into recesses 92a of the member 92 provided on the nozzle 80. More specifically, when the electromagnetic pump 84 is moved in the direction of the arrows ① to fit the outlet 87 in the second opening 90 of the nozzle 80 and when the electromagnetic pump 84 is then rotated in the direction of the arrows ②, the protrusions 93a of the brackets 93 are press-fitted into the recesses 92a of the members 92, the electromagnetic pump 84 is thereby fixed to the nozzle 80.

Figure 7A:
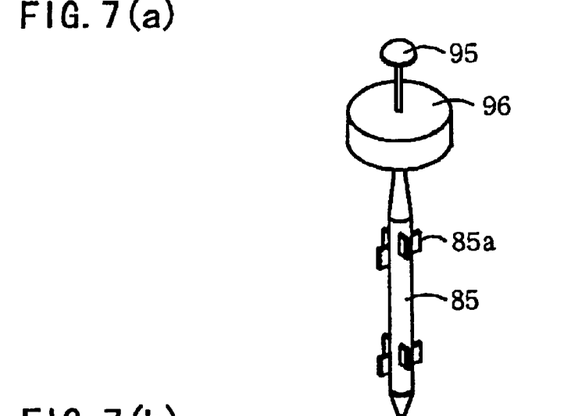
Figure 7B:
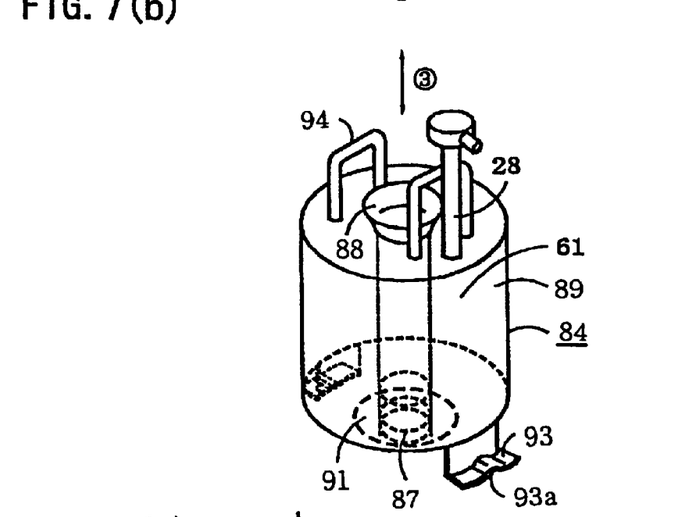
Figure 7C:
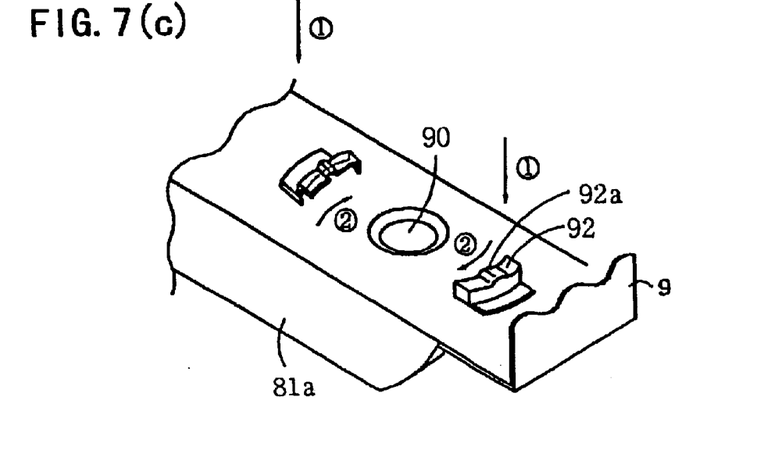
Figure 8:
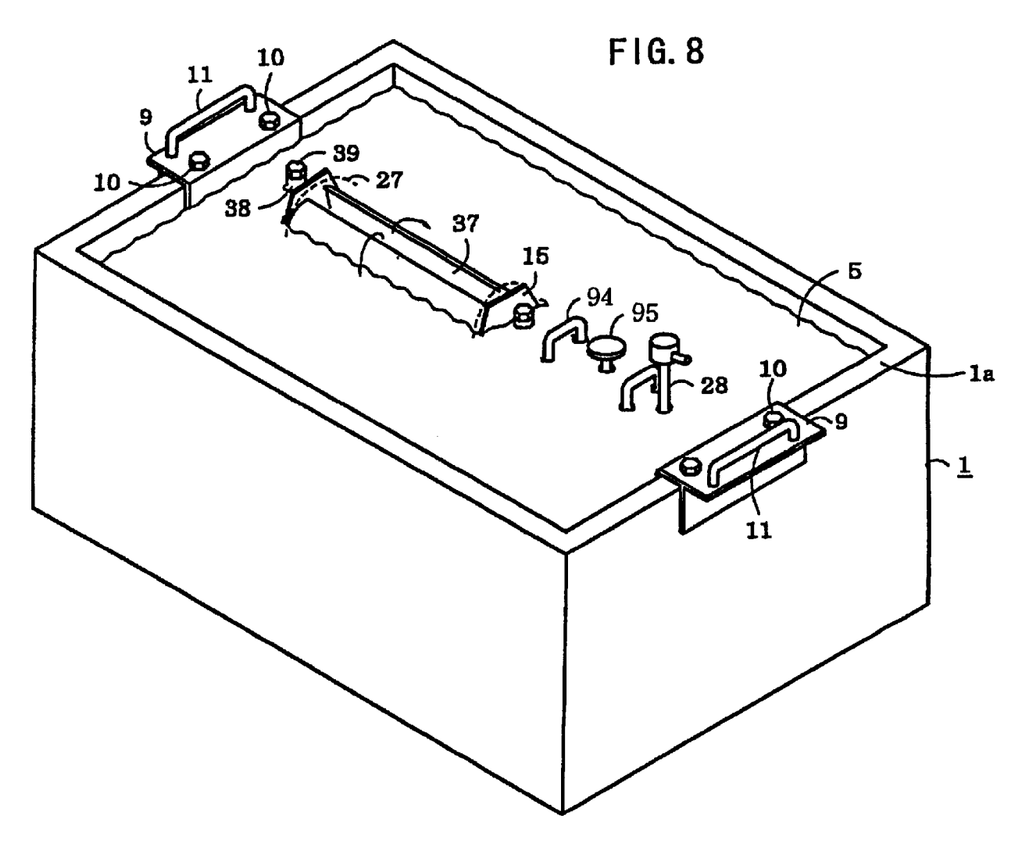
FIG. 8 is a perspective view of the soldering apparatus of FIG. 6.

The central core rod 85 is removably supported in the tubular member 86a FIG. 7(a) shows the core rod removed from the tubular member 86a. The core rod 85 has an outer peripheral surface provided with projections 85a engageable with L-shaped stoppers formed in the inside surface of the tubular member 86a so that, by inserting and rotating the core rod 85, the core rod 85 can be detachably secured. The fixing of the core rod 85 may be in any other suitable manner such as by engaging a plurality of arm-like bars provided on the periphery of a suction guide plate 96, described hereinafter, into a rotary hook mechanism comprising L-shaped grooves provided in the electromagnetic pump 84 that it can be attached and detached, or inserted and extracted easily.

The electromagnetic pump 84 can be easily removed from the nozzle 80 by following the above steps in reverse. Designated as 94 are handles protruding from the surface 5a of the molten solder 5 for facilitating the foregoing work. The handles 94 are not necessarily needed when the electromagnetic pump 84 is removed or fixed after the molten solder 5 has been discharged through a drain valve, generally provided in the bottom 2 of the solder vessel 1.

The electromagnetic pump 84, removably connected to the nozzle 80, can be easily exchanged, when a pump of different maximum delivery capacity is required. Such a case occurs when the injection member 15 is replaced with another having a different configuration to change the characteristics of the projected wave 27 so as to adjust to a change in the conditions of the printed circuit boards to be soldered.

The tubular member 86a of the electromagnetic pump 84 is disposed such that the axis of the flow path 86 is oriented to cross the surface 5a of the solder 5 contained in the solder bath 1. Since, in the specific example illustrated in FIG. 6, the flow path 86 is perpendicular to the surface 5a of the solder 5, the core rod 85 removably received in the flow path 86 is also oriented normal to the surface 5a of the solder 5.

The core rod 85 has a handle 95 extending beyond the surface 5a. Thus, by lifting/lowering the handle 95 in the direction of the arrow ③ (FIG. 7 (b)), the core rod 85 can be easily extracted from and inserted into the inlet 88 of the electromagnetic pump 84. The inlet 88 is horn-shaped so as to have high suction efficiency and to facilitate the insertion of the core rod 85 into the flow path 86 even when the inlet 88 is located under the solder 5 and invisible.

Since a cyclone-like whirl is be created at the suction port of the electromagnetic pump oriented perpendicular to the surface of the solder, ambient air above the solder surface is likely to be entrained in and cause fluctuation of the height of the projected wave formed above the blowout port. To cope with this problem, a cap-like guide plate (cap member) 96 is attached to the handle 95 of the core rod 85 for guiding the flow of the solder 5 and for preventing dirt, air or inert gas on the surface 5a of the solder 5 from being entrained in the solder fed into the pump 84. When ambient air is entrained through the inlet 88, the height of the projected wave formed above the first opening 37 of the injection member 15 will fluctuate, causing problems such as lowering the soldering quality of a printed circuit board. Since the cap member 96 allows the molten solder to be sucked from a lower area in the solder bath, the possibility of entrainment of ambient air can be eliminated and a stable projected wave can be formed.

As long as the insertion and removal of the core rod 85 of the electromagnetic pump 84 can be manipulated from a point above the surface 5a of the solder 5, the electromagnetic pump 84 is not necessarily disposed such that the core rod 85 is perpendicular to the surface 5a of the solder 5 as shown in FIG. 6, but may be arranged with the core rod 85 inclined.

As shown in FIG. 6, a small through hole 83, the area of which is sufficiently smaller than that of the first opening 37 of the injection member 15 (1/10 or smaller, for example), may be provided in a bottom wall of the horizontally extending portion 81 of the nozzle 80. Even when the small through hole 83 is provided in the bottom the nozzle 80, the supply flow rate of the solder 5 from the electromagnetic pump 84 to the injection member 15 is not substantially affected, and thus the projected wave 27 formed above the first opening 37 is not adversely affected. On the contrary, when a drain valve (not shown) provided in the bottom wall 2 of the solder vessel 1 is opened to discharge the solder 5 from the solder bath 1, the solder 5 remaining in the injection member 5, nozzle 80 and the electromagnetic pump 84 can be discharged through the small through hole 83 to the outside of the solder vessel 1. Thus, maintenance, such as cleaning of the various parts of the wave soldering apparatus can be easily carried out.

In the soldering apparatus of this embodiment, an assembly comprising the nozzle 80, the injection member 15 and the electromagnetic pump 84 is suspended from the upper edges 1a of the solder vessel 1 and secured thereto. Thus, it is possible to take the assembly out of the solder vessel 1 for maintenance such as cleaning.

Figure 9:
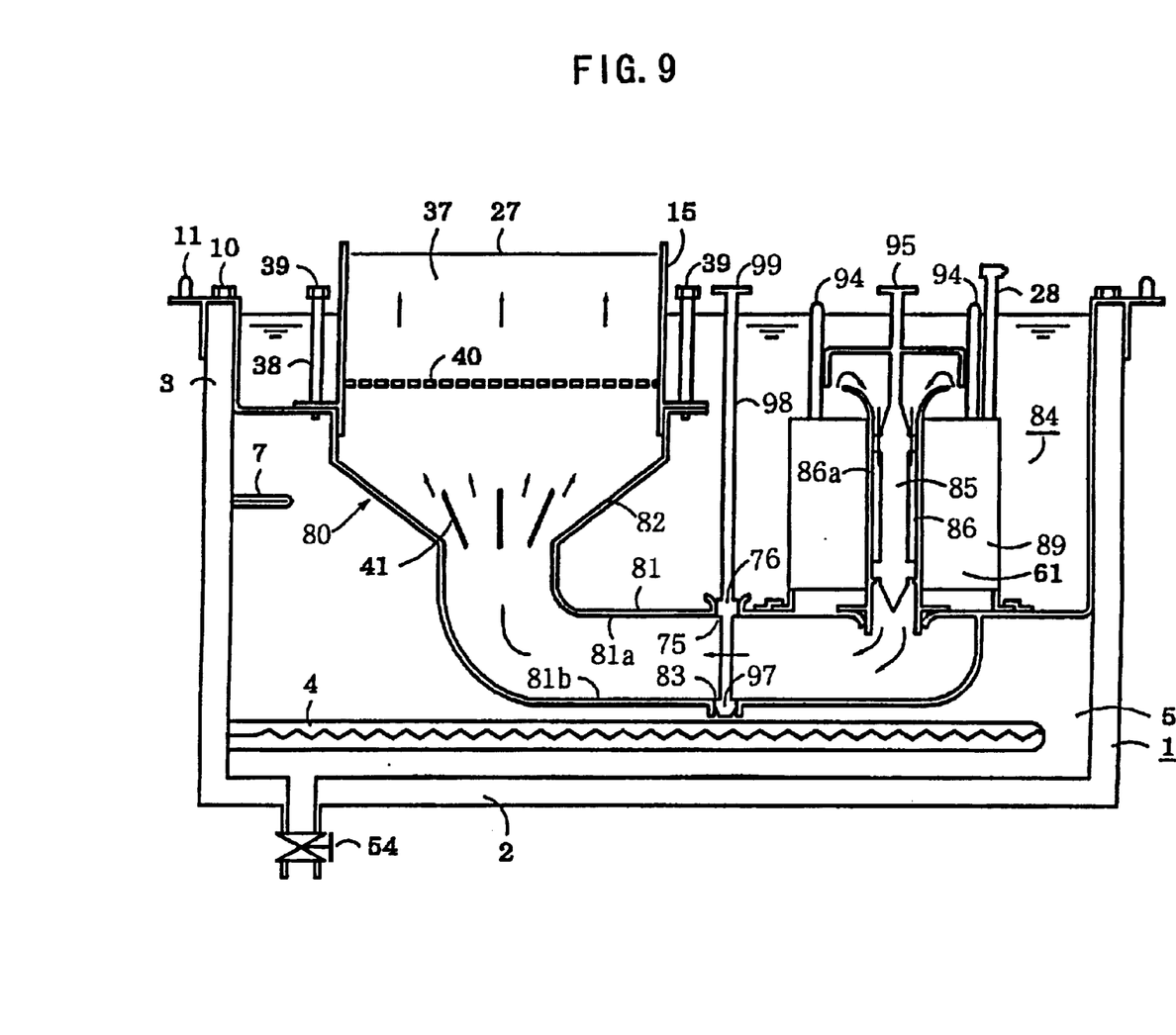
FIG. 9 is an elevational, cross-sectional view schematically illustrating a fifth embodiment of the soldering apparatus according to this invention.

FIG. 9 shows a fifth embodiment of the present invention. In FIG. 9, components designated by the same reference numerals as those in FIG. 6 have similar function and the explanation of these components is not repeated here. A temperature control device electrically connected to a temperature sensor 7 and a heater 4, a multi-phase AC power source 29 for energizing coils 42, and a control device 30 are not shown. The essential difference between the fourth embodiment of FIG. 6 and the fifth embodiment of FIG. 9 is that a closure structure for through hole 83 is additionally provided in the fifth embodiment.

A horizontally extending portion 81 of a nozzle 80 has a bottom wall 81b provided with a lower through hole 83 and an upper wall 81a provided with an upper through hole 75 coaxially aligned with the lower hole 83. A rod 98 extends through the upper hole 75 and has a lower end provided with a first fitting 97 shaped for engagement within the lower hole 83 to close the hole 83. The upper hole 75 has a size sufficient to allow the passage of the first fitting 97. The rod 98 protrudes above the surface 5a of the molten solder 5 and has a handle 99 at an upper end thereof. A second fitting 76 shaped for engagement within the upper hole 75 to close the hole 75 is provided about the rod 98 at a position so that the second fitting 76 can close the upper hole 75 of the upper wall 81a when the first fitting body 97 is fitted within the lower hole 83 of the bottom wall 81b.

Figure 10:
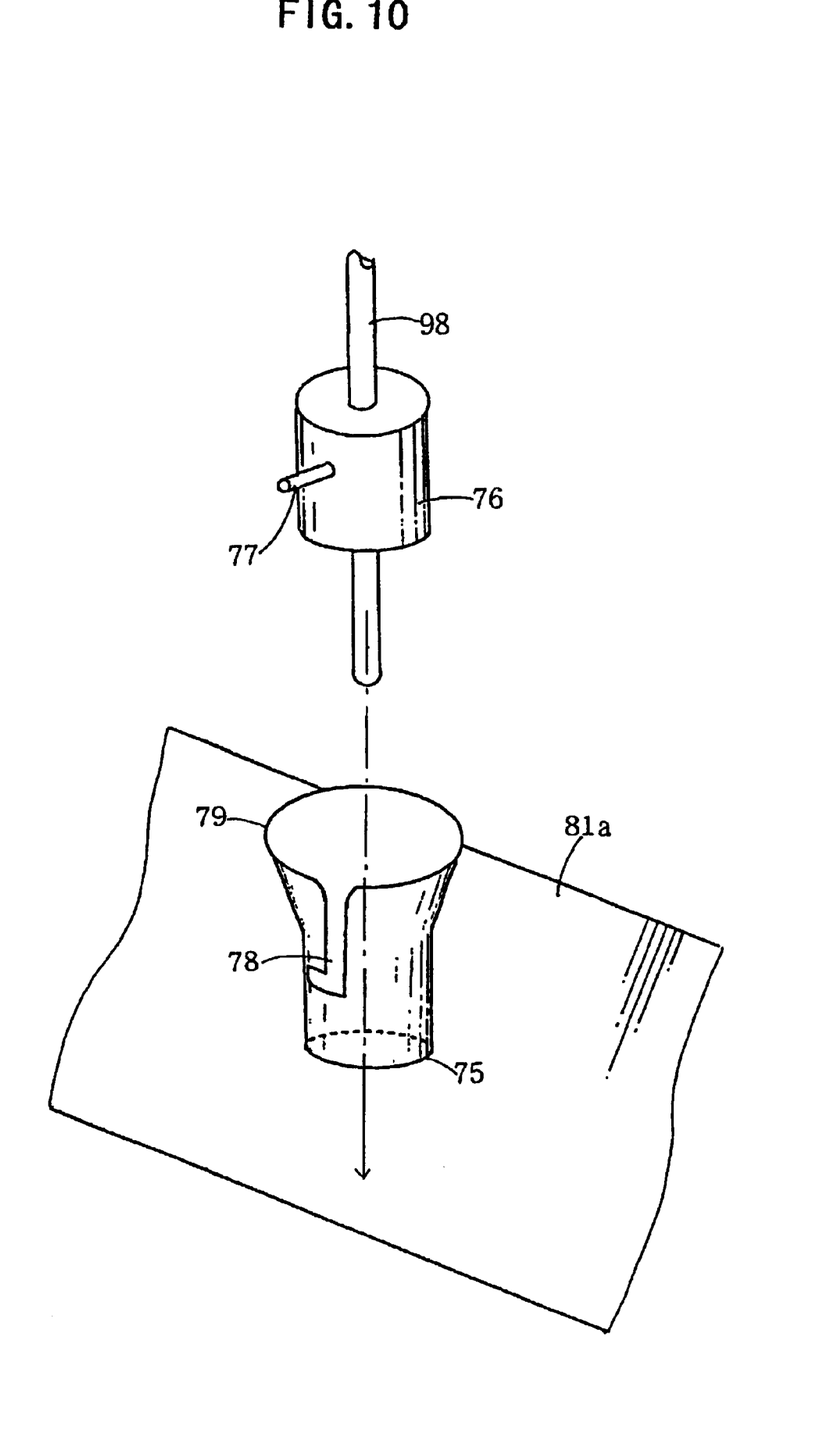
FIG. 10 is an enlarged, perspective, exploded view schematically illustrating a closure for a through hole in the nozzle of FIG. 9.

As shown in FIG. 10, the second fitting 76 of the rod 98 is provided with an engaging bar 77 adapted to be fitted into an L-shaped key hole 78 formed in a cylindrical guide 79 extending above the upper hole 75. Thus, by operating the handle 99 to move the rod 98 downward and then to turn the rod 98 for engagement of the bar 77 in the key hole 75, the rod 98 is fixed in position with the first and second fittings 97 and 76 closing the lower and upper holes 83 and 75, respectively. The rod 98 can be extracted from the nozzle 80 by reversing the above steps.

A drain valve 54 is provided in the bottom wall 2 of the vessel 1 for discharging the solder 5 therefrom.

Figure 11:
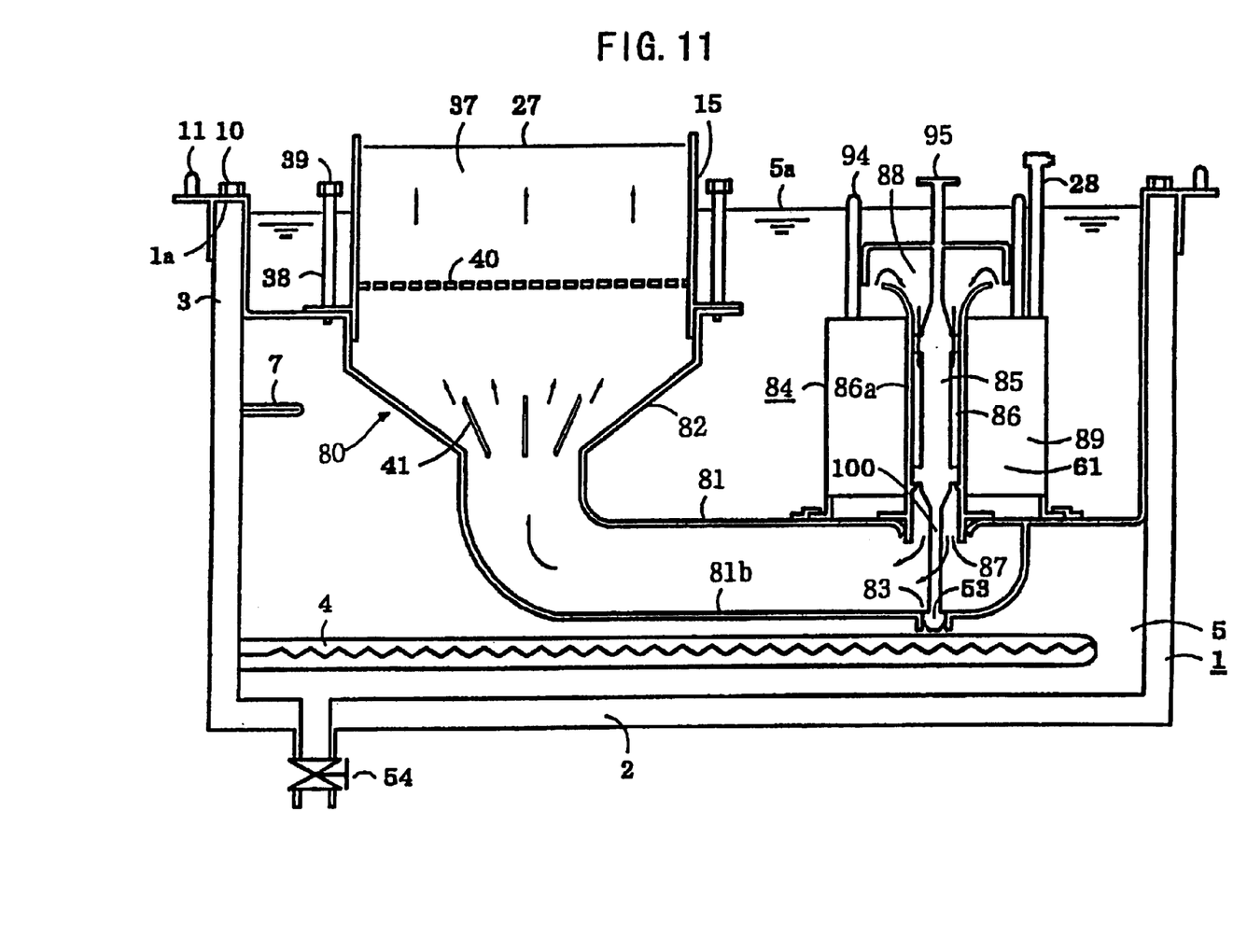
FIG. 11 is an elevational, cross-sectional view schematically illustrating a sixth embodiment of the soldering apparatus according to this invention.

FIG. 11 shows a sixth embodiment of the present invention. In FIG. 11, components designated by the same reference numerals as those in FIG. 9 have similar functions and the explanation of these components is not repeated here. A temperature control device electrically connected to a temperature sensor 7 and a heater 4, a multi-phase AC power source 29 for energizing coils 42, and a control device 30 are not shown. The essential difference between the sixth embodiment of FIG. 11 and the fifth embodiment of FIG. 9 is that opening and closing means for a through hole 83 provided in the bottom wall 81b of the nozzle 80 is integrated into the core rod 85 of the electromagnetic pump 84.

In the sixth embodiment, the through hole 83 is provided in alignment with a solder flow path 86 of the electromagnetic pump 84. The core rod 85 coaxially disposed in the solder path 86 has a lower rod 100 extending through outlet 87. The lower rod 100 has a lower end provided with a fitting 53 which is received within the through hole 83 for closing same.

Thus, when the core rod 85 of the electromagnetic pump 84 is extracted from the flow path 86, the fitting 53 is disengaged from the hole 83. When the core rod 85 is inserted into the electromagnetic pump 84 and secured in position, the fitting 53 is fitted into the through hole 83 and closes same.

Thus, in the sixth embodiment, the through hole 83 formed in the bottom wall 81b of horizontally extending portion 81 of the nozzle 80 can be opened and closed from above the surface 5a of the solder 5.

In the foregoing fifth and sixth embodiments shown in FIGS. 9 and 11, by extracting the fitting 97 or 53 from the through hole 83, the solder 5 remaining in the nozzle 80 can be discharged, facilitating maintenance work such as cleaning. The opening and closing of the through hole 83 can be easily performed from above the surface 5a of the solder 5 by use of the handle 99 (FIG. 9) or 95 (FIG. 11).

Also, when the drain valve 54 and the through hole 83 are opened, the solder 5 remaining in the injection member 15, the electromagnetic pump 84 and the nozzle 80 can be discharged from the solder vessel 1. Thus, maintenance, such as cleaning, of all parts of the soldering apparatus can be carried out easily.

Figure 12:
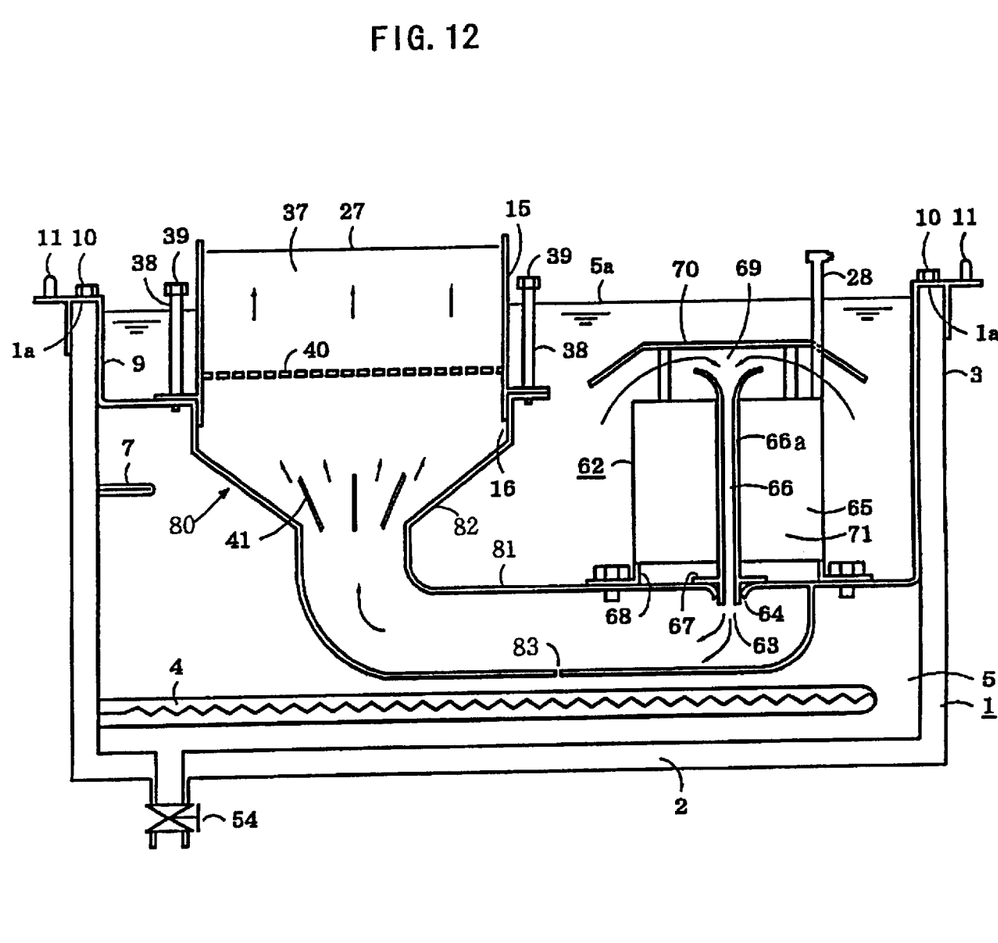
FIG. 12 is an elevational, cross-sectional view schematically illustrating a seventh embodiment of the soldering apparatus according to this invention.

FIG. 12 shows a seventh embodiment in which an FLIP type electromagnetic pump 62 is employed as in the third embodiment. In FIG. 12, components designated by the same reference numerals as those in FIG. 9 have similar functions and the explanation of these components is not repeated here. A temperature control device electrically connected to a temperature sensor 7 and a heater 4, a multi-phase AC power source 29 for energizing coils 42, and a control device 30 are not shown.

The FLIP type electromagnetic pump 62 has no core rod but has a flat slit-like thrust generating flow path 66 defined by a flat tubular member 66a. Housed cores 65 and coils 71 wound around the cores 65 are disposed on both sides of the flat tubular member 66a. There is also a known FLIP type electromagnetic pump in which a housed core is disposed on one side of a flat tubular member with a housed core having coils wound therearound being provided on the other side thereof.

While an ALIP type electromagnetic pump has a cylindrical shape, the FLIP type electromagnetic pump 62 has a rectangular solid shape and has a suction port (inlet) 69 and a discharge port (outlet) 63 each having a rectangular shape with a high aspect ratio, namely a slit like shape. Thus, the electromagnetic pump 62 has flanges 67 and a guide plate 70 which have rectangular shapes corresponding to the suction port 69 and the discharge port 63, respectively. Also, a second opening 64 which is formed in an upper wall of a horizontally extending portion 81 of a nozzle 80 and into which the tubular member 66a of the FLIP type electromagnetic pump 62 is fitted is also formed with a slit-like configuration. The FLIP type electromagnetic pump 62 has bracket 68 with which it is detachably secured to the nozzle 8 by screws. Naturally, known attachment means other than screws may be used.

the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Applications No. 2001-336279 and No. 2001-336280, filed Nov. 1, 2001, inclusive of the specifications, claims and drawings, are hereby incorporated by reference herein.

What is claimed is:

1. A soldering apparatus for soldering a printed wiring board, comprising:
   a solder vessel containing molten solder; a nozzle disposed in said vessel and having a first opening at one end thereof and a second opening at the other end thereof, said first opening being disposed above the surface level of the molten solder contained in said vessel; and
   an electromagnetic pump secured in said vessel and including:
      a tubular member defining a solder flow path therein and having an inlet and an outlet connected to said second opening of said nozzle such that the molten solder can flow from said inlet to said outlet through said path,
      one or more cores, and
      one or more electrically energizable coils,
   said tubular member, said cores and said coils being immersed in the molten solder below the surface level of the molten solder so that thermal energy generated by the electromagnetic pump is transferred to the solder, said electromagnetic pump being arranged to generate a moving magnetic field in said path when said coils are electrically energized, so that the molten solder is fed from said inlet to said outlet and is projected from said first opening of said nozzle to form a solder wave.

2. An apparatus as claimed in claim 1, wherein said inlet represents a lower end of said tubular member so that the molten solder flows upward through said path.

3. An apparatus as claimed in claim 2, wherein said tubular member has a circular cross-section, wherein said cores include a core rod disposed in said tubular member to define an annular path therebetween; and outside core members disposed to surround said tubular member, and wherein said coils are wound around said outside core members.

4. An apparatus as claimed in claim 3, wherein said nozzle extends upwardly from said second opening toward said first opening.

5. An apparatus as claimed in claim 3, wherein said inside core rod is detachably secured to said tubular member.

6. An apparatus as claimed in claim 4, further comprising a handle extending upward from an upper end of said inside core rod into said nozzle such that the detaching and attaching of said inside core rod relative to said tubular member can be carried out by operation of said handle.

7. An apparatus as claimed in claim 6, wherein said handle has a radially enlarged portion located in said nozzle to control the flow of said molten solder discharged from said outlet.

8. An apparatus as claimed in claim 3, wherein said nozzle has a generally horizontally extending portion and an upwardly extending portion contiguous to said horizontally extending portion, and wherein said second opening and first opening are defined in said horizontally extending portion and said upwardly extending portion, respectively, so that the molten solder flows upward through said annular path, then horizontally through said horizontally extending portion and thereafter upward through said upwardly extending portion.

9. An apparatus as claimed in claim 8, further comprising a hole provided in an upper side of said horizontally extending portion, a handle extending upward from an upper end of said core rod through said hole and out of said nozzle, and a closure member secured to said handle and engageable with said hole to close the hole, wherein said core rod is detachably secured to said tubular member such that said core rod is able to be removed from or inserted into said tubular member by operation of said handle.

10. An apparatus as claimed in claim 9, further comprising a flow control perforated plate disposed horizontally in said upwardly extending portion of said nozzle for uniformly distributing the flow of the molten solder through said nozzle.

11. An apparatus as claimed in claim 2, wherein said path is in the form of a slit, and wherein said cores and coils are arranged to on both sides of said slit path.

12. An apparatus as claimed in claim 11, further comprising a flow control perforated plate disposed horizontally in said nozzle for uniformly distributing the flow of the molten solder through said nozzle.

13. An apparatus as claimed in claim 1, wherein said nozzle has a generally horizontally extending portion and an upwardly extending portion contiguous to said horizontally extending portion, and wherein said second opening and first opening are defined in said horizontally extending portion and said upwardly extending portion, respectively, and wherein said inlet represents an upper end of said tubular member so that the molten solder flows downward through said path, then horizontally through said horizontally extending portion and thereafter upward through said upwardly extending portion.

14. An apparatus as claimed in claim 13, wherein said tubular member has a circular cross-section, wherein said cores include an inside core rod disposed in said tubular member to define an annular path therebetween; and outside core members disposed to surround said tubular member, and wherein said coils are wound around said outside core members.

15. An apparatus as claimed in claim 14, wherein said inside core rod is detachably secured to said tubular member.

16. An apparatus as claimed in claim 15, further comprising a handle extending upward from an upper end of said inside core rod such that the detaching and attaching of said inside core rod relative to said tubular member can be carried out by operation of said handle.

17. An apparatus as claimed in claim 13, further comprising a through hole provided in a lower side of said horizontally extending portion.

18. An apparatus as claimed in claim 17, further comprising means for opening and closing said hole.

19. An apparatus as claimed in claim 15, further comprising a through hole provided in a lower side of said horizontally extending portion, and a plug member extending downward from a lower end of said inside core rod and having an end portion engageable with said through hole so that said through hole is kept closed during attachment of said inside core rod to said tubular member but is opened when said inside core rod is detached from said tubular member.

20. An apparatus as claimed in claim 13, further comprising a flow control perforated plate disposed horizontally in said upwardly extending portion of said nozzle for uniformly distributing the flow of the molten solder through said nozzle.

21. An apparatus as claimed in claim 13, wherein said path is in the form of a slit, and wherein said cores and coils are arranged on both sides of said slit path.

22. An apparatus as claimed in claim 13, further comprising a cover plate disposed above said inlet and shaped to prevent that portion of the molten solder which is present adjacent to the surface level to be fed into said inlet.

23. An apparatus as claimed in claim 13, wherein said electromagnetic pump is detachably secured to said horizontally extending portion of said nozzle.

24. An apparatus as claimed in claim 1 wherein said solder vessel includes a bottom and walls extending from said bottom to an upper edge and wherein said electromagnetic pump is suspended from said upper edge.

* * * * *